Dec. 23, 1969  J. R. BORDEN  3,485,406
REMOVABLE CLOSURE AND FASTENING MEANS
Filed May 29, 1967
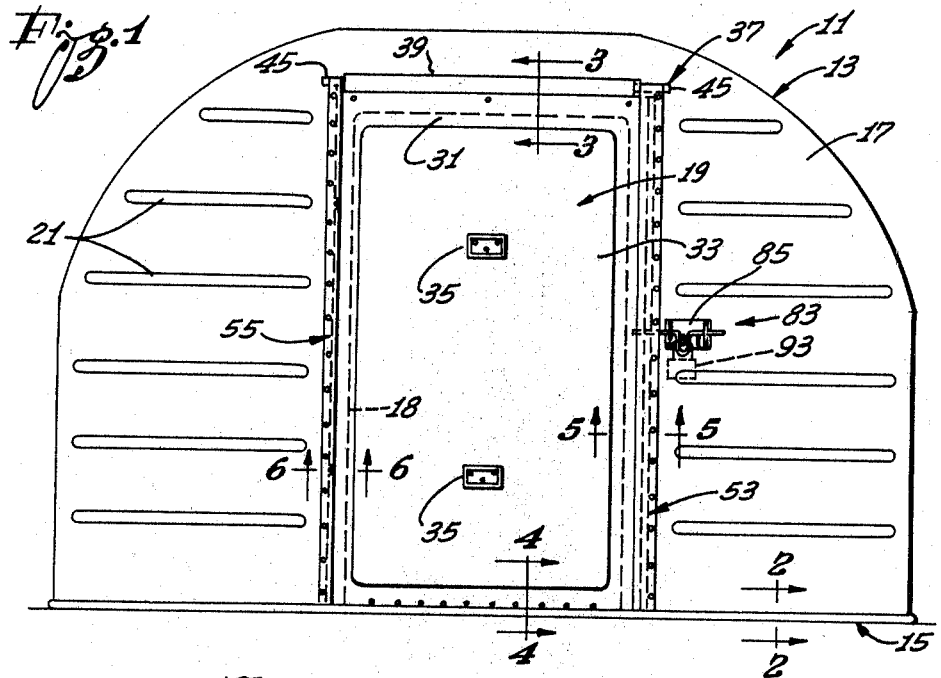
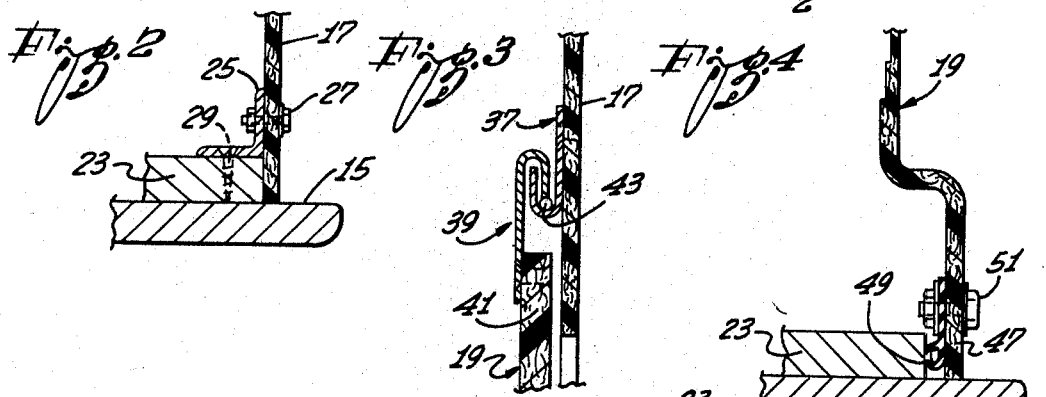
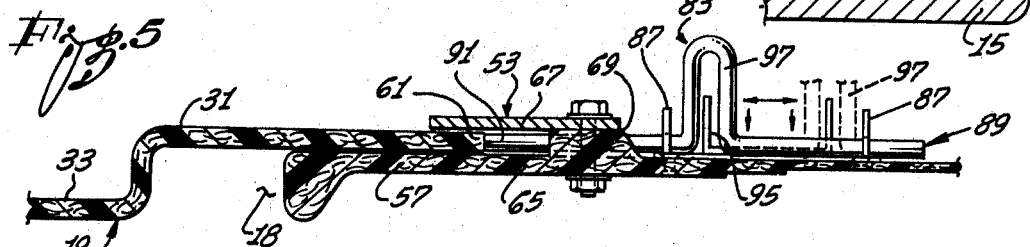
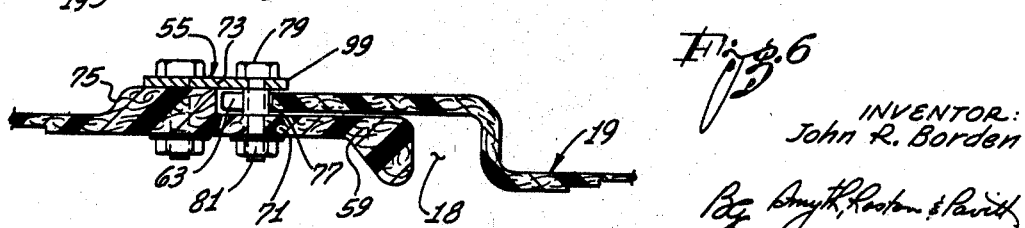
INVENTOR:
John R. Borden
ATTORNEYS

United States Patent Office 3,485,406
Patented Dec. 23, 1969

3,485,406
REMOVABLE CLOSURE AND FASTENING MEANS
John R. Borden, Manhattan Beach, Calif., assignor, by mesne assignments, to Tridair Industries, Redondo Beach, Calif.
Filed May 29, 1967, Ser. No. 643,804
Int. Cl. B65j 1/02; E06b 3/32
U.S. Cl. 220—1.5
11 Claims

ABSTRACT OF THE DISCLOSURE

This disclosure describes a removable cover or door for a container and is particularly adapted for use in connection with containers of the type utilized in air cargo transportation. In the specific embodiment disclosed, the door is retained on the container in an installed position by suitable channel means that are mounted on container adjacent an opening therein. As disclosed, coacting hook means are provided on the door and the container along a portion of the edge of the door to further retain the door on the container. A suitable releasable lock prevents removal of the door from the channels.

BACKGROUND OF THE INVENTION

Cargo is frequently unitized to facilitate transportation thereof. Cargo which is to be transported by air is often unitized or containerized in cargo carrying units each of which includes a base or pallet and a container mounted on the base. Heretofore, it was common practice to provide a relatively large opening in the side wall of the container to facilitate loading and unloading of cargo. The cargo carrying units are quite large and the opening therein is similarly quite large and oftentimes, an entire wall of the container may be left open. Cargo is loaded into the cargo carrying units through the opening therein, and the units are then moved into an aircraft or other cargo transporting vehicle.

The cargo carrying units having cargo therein are frequently left in areas where obtaining access thereto is relatively easy. Because of the large opening therein, stealing of the cargo has become a problem.

Accordingly, it has been proposed to cover the opening in the wall of the containers to prevent unauthorized access thereto. Because of the special problems involved in cargo transportation and particularly air cargo transportation, this is much more difficult than it may at first appear.

Cargo carrying units are oftentimes stored and/or transported on dollies. Frequently, the dollies have curbing which projects upwardly from the base or floor of the dolly. This makes use of the usual hinged door unsatisfactory, because the curbing would prevent complete opening of the hinged door. Similarly, the usual hinged door would also be unsatisfactory in that opening thereof in any crowded storage area would not be possible.

To facilitate loading and unloading of cargo from the container, the opening therein should be of substantial size. Accordingly, the door must also have substantial size. Thus, if a sliding door were used, the contour of the wall of the container would be broken when the door was slid to expose the opening. This undesirable feature of a sliding door makes such a design unsuitable for use in the air cargo transportation field.

Of course, any cover or door which would open inwardly into the container would be unsatisfactory in that it would reduce the interior storage volume of the aircraft. Similarly, complex and expensive door designs are to be avoided.

SUMMARY OF THE INVENTION

The present invention teaches that the disadvantages mentioned above can be overcome by utilizing a removable door to cover the opening in the container. The door of this invention is easily installed on and removed from the container and no bolts or other similar type of fastening means are required. The door is constructed of a lightweight material to further facilitate installation and removal thereof. The door of this invention provides the additional advantage of substantially sealing the opening against ingress of water.

One feature of this invention is the use of channels to retain the door on the container. Preferably the channels are mounted along opposed edge portions of the opening and open toward the opening. The door is sized so that an edge portion thereof may be slid all the way into one of the channels and then slid in the opposite direction into the other channel. The channel into which the door is first slid is preferably deeper than the second channel so that when the door is slid into the second channel, it cannot be withdrawn outwardly from either of the channels. Stated another way, the door can only be withdrawn from the channels by reversing the sequence which permitted insertion of the door into both of the channels.

Reversing of the sequence is preferably prevented by releasable locking means which may take the form of a movable member engageable with an edge portion of the door to prevent movement of the door back toward the first channel. The locking means may include a simple garage door lock, if desired.

Suitable means for preventing withdrawal of the door from the channels by moving the door generally parallel of the channels is also provided. Although such means may be embodied in various physical forms, it is preferred to notch the edge portion of the door that is received in the second channel and to provide a pin or stop member in the second channel. Thus, when the door is moved toward and into the second channel, the stop member is received within the recess. The locking means locks the door in this position with the stop member received within the recess. Accordingly, the stop member and recess coact to prevent withdrawal of the door by movement of the door in a direction generally parallel to the channels.

Several short movements of the door are required to install the door on the wall; however, the door is moved for only short distances and it is not necessary to break the contour of the container. Thus there is no need to insert the door into the channels by raising the door above the channels and then lowering the door into the channels.

Another feature of the present invention is to utilize cooperating hook means on the door and the wall of the container having the opening. The cooperating hook means are very easily engaged and by providing suitable channel means and locking means, the door can be quickly and completely secured to the container.

To provide a very strong container-to-door lock, it is preferred to use the two channels along lateral edges of the opening and door and to provide the cooperating hook means along the upper edges of the door and the opening. The hook means thus act as additional means for preventing outward movement of the upper edge portion of the door from the container and for preventing downward movement of the door relative to the container. In addition, the hook on the container performs the advantageous function of serving as a gutter to catch runoff and prevent leakage between the door and container along the upper edge thereof.

The invention, both as to its organization and method of operation together with further features and advantages thereof may best be understood by reference to the following descripion taken in connection with the accompanying illustrative drawing.

BRIEF DESCRIPTION OF THE DRAWINGS

FIG. 1 is a front elevational view of a typical cargo carrying unit having a door constructed in accordance with the teachings of this invention installed thereon.

FIG. 2 is a typical enlarged fragmentary sectional view taken along line 2—2 of FIG. 1 and showing one manner of securing the container to the base.

FIG. 3 is an enlarged fragmentary sectional view taken along line 3—3 of FIG. 1 and showing the cooperating hook means on the door and the container.

FIG. 4 is an enlarged fragmentary sectional view taken along line 4—4 of FIG. 1.

FIG. 5 is an enlarged fragmentary sectional view taken along line 5—5 of FIG. 1 and shows one of the channels and the garage door lock.

FIG. 6 is an enlarged fragmentary sectional view showing the other of the channels and the recess and bolt for preventing movement of the door in a direction generally parallel to the channels.

DESCRIPTION OF THE PREFERRED EMBODIMENT

Referring to the drawings and in particular to FIG. 1 thereof, reference numeral 11 designates a typical cargo carrying unit to which the present invention may be applied. The unit 11 includes a container 13 which may be constructed of fiberglass or other suitable strong lightweight material and a base or a pallet 15 secured to the container and forming a floor structure therefor. The container 13 has a wall 17 with an opening 18 therein which is covered by a removable door 19. The wall 17 as well as the other surfaces of the container 13 may have a series of corrugations 21 formed therein.

FIG. 2 shows by way of illustration a typical container to base connection. The pallet 15 has a floor 23 of suitable material such as plywood suitably secured thereto and the lower edge of the wall 17 rests on the base 15 and abuts the outer edge of the floor 23. An elongated angle 25 is suitably secured to the wall 17 and the floor 23 as by bolts 27 and screws 29, respectively.

The door 19 is sized to completely cover the opening in the wall 17. The door 19 is constructed of a suitable strong lightweight material such as fiberglass or Royalex. The door 19 has a peripheral region 31 and a recessed central region 33 (FIGS. 1 and 5) on which a pair of handles 35 are mounted.

An elongated upwardly opening hook 37 is suitably mounted to the wall 17 above and closely adjacent the upper edge of the opening 18 (FIGS. 1 and 3). A cooperating elongated hook 39 is mounted on the door 19 and extends along an upper edge portion 41 for substantially the full length thereof. An elongated resilient seal 43 extends along the bottom of the hook 37 and is clamped between the end of the hook 39 and the bottom of the hook 37 as shown in FIG. 3. With the hooks 37 and 39 engaged as shown in FIG. 3, the upper edge portion 41 of the door 19 is prevented from moving outwardly generally perpendicularly to the wall 17 and, the door 19 is prevented from moving downwardly substantially relative to the wall 17. The upward opening hook 37 acts as a gutter to catch water runoff from the container 13. In this connection, ti may be desirable to incline the hooks 37 slightly from the horizontal to allow the water to run off one edge thereof. As shown in FIG. 1, the hook 37 has lateral ends 45 which extend laterally beyond the door 19 for the purpose of pouring the water down the side of the wall 19 rather than along the container-to-door interface.

Substantial watertightness between a lower edge portion 47 of the door 19 and the base 15 is obtained as shown in FIG. 4. An elongated resilient seal 49 is suitably secured to the lower edge portion 47 of the door 19 as by a plurality of bolts 51. The seal is held tightly between the floor 23 and the lower edge portion 47 as shown to provide a substantially watertight seal. In addition, the lower edge of the door 19 rests on or substantially rests on the base 15 as shown to further discourage ingress of water into the container.

FIGS. 5 and 6 show a pair of channels 53 and 55 which extend along lateral portions 57 and 59, respectively, of the wall 17 adjacent the opening 18. The channels 53 and 55 are generally U-shaped in cross section, open toward the opening 18 and toward each other, and preferably extend continuously for the full height of the door 19. The door 19 has lateral edge portions 61 and 63 which are received within the channels 53 and 55, respectively.

The channel 53 has an inner flange 65 and an outer flange 67 interconnected by a web 69. Similarly the channel 55 has an inner flange 71 and an outer flange 73 interconnected by a web 75. Each of the channels 53 and 55 may be separate channel members which are individually mounted on the wall 17 or, the channels may be formed integrally with the wall 17. However, in the embodiment illustrated, the inner flanges 65 and 71 are formed by portions of the container wall 17 and the webs 69 and 75 are formed by elongated vertically extending ribs formed integrally with the wall 17. The outer flanges 67 and 73 in the embodiment illustrated are elongated strips of a strong material such as steel.

As is apparent from comparing FIGS. 5 and 6, the unrestricted depth of the channel 53 is greater than the restricted depth of the channel 55. More particularly, the outer flange 67 extends laterally of the web 69 a greater distance than the flange 73 extends laterally of the web 75. As explained more fully hereinbelow, this feature of the invention allows the door 19 to be inserted first into the channel 53 and then slid laterally into the channel 55 to thereby cause the door 19 to be retained simultaneously by both of the channels 53 and 55 as shown in FIGS. 5 and 6.

With the door 19 locked to the container 13 as shown in the drawing, the lateral edge portion 63 thereof lies closely adjacent the web 75. The door 19 has a recess 77 (FIGS. 1 and 6) formed in the edge portion 63 thereof and opening toward the web 75. Stop means in the form of a pin or bolt 79 extends through the flanges 73 and 71 and is retained therein by a nut 81. The pin 79 is received in the recess 77 when the door 19 is in the locked position in which the lateral edge portion 63 is disposed closely adjacent the web 75. One or more of the recess 77 and pin 79 may be provided as desired. The recess 77 and the pin 79 coact to prevent relative vertical movement between the door 19 and the wall 17.

In the embodiment illustrated, the door 19 is maintained in the locked position by releasable locking means 83 (FIGS. 1 and 5). Although the locking means 83 may take various forms, in the embodiment illustrated the locking means is embodied in a conventional garage door lock. The locking means 83 includes a mounting plate 85 suitably secured to the wall 17 adjacent the opening 18 and adjacent the edge portion 61 of the door 19. The mounting plate 85 has a pair of integral apertured mounting tabs 87 for mounting a slidable member or locking bolt 89 for movement toward and away from the edge portion 61 of the door 19. The locking bolt 89 is slidable between a locking position shown in full lines in FIG. 5 and a releasing position shown in phantom. In the locking position, an inner end 91 of the bolt 89 is engageable with the edge portion 61 to prevent any substantial movement of the door 19 toward the web 69, i.e. toward the right as viewed in FIGS. 1 and 5. A padlock 93 (FIG. 1) can be locked in an apertured locking tab 95 to retain a U-shaped portion 97 between the padlock and the wall 17 as shown in FIG. 1. In FIG. 5, the portion 97 is shown rotated upwardly 90° from the position it occupies when the padlock is in place in the tab 95. The locking tabe 95 prevents movement of the locking bolt 89 out of the locking position when the padlock is mounted in the apertured locking tab 95. By removing the padlock 93, the U-shaped portion 97 of the bolt 89 can be rotated upwardly to the position shown in FIG. 5 to clear the locking tab 95 to allow movement of the locking bolt away from the lateral edge portion 61 to the releasing position in which it does not interfere with lateral movement of the door 19 to the right.

Assuming that the bolt 89 is in the releasing position, the door 19 can be installed over the opening 18 by first inserting the right hand edge portion 61 thereof into the channel 53. This is accomplished by holding the door 19 directly in front of the opening 18 and tilting it slightly about a generally vertical axis. There is no need to drop the door into the channels 53 and 55 from above. The edge portion 61 may be moved all the way into the channel 53 and into engagement with the web 69 as the locking bolt 89 is in the releasing position. The door 19 may be raised from the position shown in FIG. 3 during this movement thereof to allow the hook 39 to be at least slightly above the hook 37. The door 19 is sized so that with the edge portion 61 engaging the web 69, that the left hand edge portion 63 thereof will just slip by an end 99 of the outer flange 73.

Next, with the door 19 aligned with the channels 53 and 55, the door is lowered to cause engagement of the hooks 37 and 39 as shown in FIG. 3. The door 19 is then moved to the left to the position shown in FIG. 6 to cause the recess 77 to receive the pin 79. In this position both of the channels 53 and 55 are operative to retain the door 19 as shown in FIGS. 5 and 6 because the depth of the channel 53 is greater than the depth of the channel 55. The locking bolt 89 is then moved to the locking position and the padlock 93 is locked in place in the locking tab 95.

In the locking position, upward movement of the door 19 is prevented by the pin 79 and the recess 77 and downward movement is prevented by the hooks 37 and 39 and the engagement of the lower edge portion 47 and the base 15 as shown in FIG. 4. Lateral movement to the right is prevented by the inner end 91 of the locking bolt 89 which engages the edge portion 61 of the door 19. Lateral movement to the left is prevented by the web 75 and/or the pin 79 and the recess 77. The outer flanges 67 and 73 and the hooks 37 and 39 prevent outward movement of the door 19. Thus, the door 19 is securely held in position over the opening 18.

To remove the door, the padlock 93 is unlocked and the locking bolt 89 is moved to the releasing position. This allows movement of the door 19 to the right until the edge portion 61 engages the web 69. The door 19 is then raised to disengage the hooks 37 and 39 and the left edge portion 63 is pivoted outwardly out of the channel 55. Following this, the edge portion 61 is withdrawn from the channel 53.

Although an exemplary embodiment of the invention has been shown and described, many changes, modifications, and substitutions may be made by one having ordinary skill in the art without necessarily departing from the spirit and scope of this invention.

I claim:
1. In a cargo carrying unit, the combination of:
   a base;
   a container attached to the base and having a wall with an opening therein to provide access to the interior of the container, said base providing a floor structure for the container and said opening having upper, lower and generally opposed lateral edges;
   a removable door sized to cover said opening and having upper, lower, and generally opposed lateral edge portions;
   first means disposed along one of said lateral edges of said opening for receiving one of said edge portions of said door and for retaining said one edge portion against lateral movement away from the opening and against movement outwardly of the wall, said door being movable toward the other lateral edge of said opening;
   second means disposed along the said other lateral edge of the opening and receiving the other of said lateral edge portions of said door upon movement of said door laterally toward said other lateral edge, said second means retaining said other lateral edge portion against movement outwardly away from the wall and limiting movement of said door toward said other lateral edge;
   interengageable means engageable in response to said movement of the door toward said other lateral edge for locking said door against upward movement;
   releasable locking means for preventing said door from moving laterally a sufficient amount to disengage and release said interengageable means; and
   means for retaining said door against substantial downward movement relative to the container.

2. A combination as defined in claim 1 wherein said door is movable generally along said opposed lateral edges of the opening before the engagement of the interengaging means and including means adjacent the upper edge portion of the door and the upper edge of the opening responsive to limited downward movement of the door for retaining said upper edge portion against movement outwardly away from the wall.

3. A combination as defined in claim 2 wherein said interengageable means is responsive to said limited downward movement of the door and to movement of the door toward said other lateral edge of the opening for locking the door against upward movement.

4. In a cargo carrying unit, the combination of:
   a base;
   a container attached to the base and having a wall with an opening therein to provide access to the interior of the container, said base providing a floor structure for the container and said opening having an upper edge and first and second lateral edges;
   hook means disposed along said upper edge of the opening in the wall and opening upwardly;
   a removable door sized to cover said opening in the wall and having an upper edge portion and first and second lateral edge portions, said door having coacting hook means along said upper edge portion thereof opening downwardly toward the opening in said wall when the door is covering said opening, said hook means on said door being at least partially receivable within the hook means on said wall;
   first and second channel means on said wall extending along said first and second lateral edges, respectively, of said opening for receiving the first and second lateral edge portions, respectively, of said door to prevent movement of said door away from said wall and laterally of said opening; and
   releasable means for retaining said first and second lateral edge portions within said first and second channel means, respectively.

5. A combination as defined in claim 4 including sealing means engageable with both of said hook means to seal the opening along the upper edge thereof.

6. A combination as defined in claim 4 wherein the hook means on the wall extends at least substantially continuously along the upper edge of the opening and acts as a gutter to catch water runoff from the wall, said hook means on the wall having lateral ends which extend laterally beyond the door so that water draining from the gutter will run down the wall rather along the container-to-door juncture.

7. In a removable door structure, the combination of:
   a wall having an opening therein;
   first substantially rigid channel means on said wall adjacent said opening and including inner and outer flanges interconnected by a web with the web being remote from the opening and with the flanges extending toward the opening, said first channel means defining a first groove opening toward said opening in said wall;

a second substantially rigid channel means on said wall adjacent said opening including inner and outer flanges interconnected by a web with the web being remote from the opening and with the flanges extending toward the opening, said second channel defining a second groove opening toward said opening in said wall, said outer flange of said second channel means terminating in an end remote from the web thereof, said first and second channel means being disposed on opposite sides of said opening, said first groove having an unrestricted depth which is greater than the unrestricted depth of the second groove;

removable door means sized to close said opening and having opposed edge portions, said door means having a width between said edge portions no greater than the approximate distance between the web of the first channel means and said end of the outer flange of said second channel means to allow insertion of one of said edge portions of the door means into the first groove and subsequent insertion of the other of said edge portions of the door means past said end of the outer flange into said second groove whereby the outer flanges of said first and second channel means retain said door means against movement outwardly away from the wall, said inner flanges of said first and second channel means retain said door means against movement inwardly away from the wall and said webs restrict movement of said door means between said first and second channel means;

releasable locking means engageable with the door means for preventing movement of said one edge portion of the door means back toward the web of the first channel means a sufficient distance to allow removal of the door means;

means for preventing removal of the door means by moving the door generally parallel to the first and second grooves; and said first channel means including a rib on said wall adjacent said opening and defining said web of said first channel means and a plate secured to said rib and defining said outer flange of said first channel means, said wall opposite said plate defining said inner flange of said first channel means.

8. In a removable door structure, the combination of:

a wall having an opening therein;

first substantially rigid channel means on said wall adjacent said opening and including inner and outer flanges interconnected by a web with the web being remote from the opening and with the flanges extending toward the opening, said first channel means defining a first groove opening toward said opening in said wall;

a second substantially rigid channel means on said wall adjacent said opening including inner and outer flanges interconnected by a web being remote from the opening and with the flanges extending toward the opening, said second channel means defining a second groove opening toward said opening in said wall, said outer flange of said second channel means terminating in an end remote from the web thereof, said first and second channel means being disposed on opposite sides of said opening, said first groove having an unrestricted depth which is greater than the unrestricted depth of the second groove;

removable door means sized to close said opening and having opposed edge portions, said door means having a width between said edge portions no greater than the approximate distance between the web of the first channel means and said end of the outer flange of said second channel means to allow insertion of one of said edge portions of the door means into the first groove and subsequent insertion of the other of said edge portions of the door means past said end of the outer flange into said second groove whereby the outer flanges of said first and second channel means retain said door means against movement outwardly away from the wall, said inner flanges of said first and second channel means retain said door means against movement inwardly away from the wall and said webs restrict movement of said door means between said first and second channel means;

releasable locking means engageable with the door means for preventing movement of said one edge portion of the door means back toward the web of the first channel means a sufficient distance to allow removal of the door means;

means for preventing removal of the door means by moving the door generally parallel to the first and second grooves; and said releasable locking means including a movable member mounted on said wall and movable between a locking position in which said movable member is engageable with said one edge portion of said door means to prevent movement of said one edge portion of said door means back toward the web of said first channel means a sufficient distance to allow removal of the door means and a releasing position in which said movable member allows movement of said one edge portion of the door means back toward the web of said first channel means a sufficient distance to allow removal of the door means, and means to lock said movable member in said locking position thereof.

9. In a removable door structure, the combination of:

a wall having an opening therein;

first substantially rigid channel means on said wall adjacent said opening and including inner and outer flanges interconnected by a web with the web being remote from the opening and with the flanges extending toward the opening, said first channel means defining a first groove opening toward said opening in said wall;

a second substantially rigid channel means on said wall adjacent said opening including inner and outer flanges interconnected by a web with the web being remote from the opening and with the flanges extending toward the opening, said second channel means defining a second groove opening toward said opening in said wall, said outer flange of said second channel means terminating in an end remote from the web thereof, said first and second channel means being disposed on opposite sides of said opening, said first groove having an unrestricted depth which is greater than the unrestricted depth of the second groove;

removable door means sized to closed said opening and having opposed edge portions, said door means having a width between said edge portions no greater than the approximate distance between the web of the first channel means and said end of the outer flange of said second channel means to allow insertion of one of said edge portions of the door means into the first groove and subsequent insertion of the other of said edge portions of the door means past said end of the outer flange into said second groove whereby the outer flanges of said first and second channel means retain said door means against movement outwardly away from the wall, said inner flanges of said first and second channel means retain said door means against movement inwardly away from the wall and said webs restrict movement of said door means between said first and second channels means;

releasable locking means engageable with the door means for preventing movement of said one edge portion of the door means back toward the web of the first channel means a sufficient distance to allow removal of the door means;

means for preventing removal of the door means by moving the door generally parallel to the first and second grooves; and said last mentioned means including a recess in said other edge portion of said door means and stop means in said second groove receivable in said recess to lock said door means against substantial movement generally parallel to the grooves.

10. In a removable door structure, the combination of:

a wall having an opening therein;

first substantially rigid channel means on said wall adjacent said opening and including inner and outer flanges interconnected by a web with the web being remote from the opening and with the flanges extending toward the opening, said first channel means defining a first groove opening toward said opening in said wall;

a second substantially rigid channel means on said wall adjacent said opening including inner and outer flanges interconnected by a web with the web being remote from the opening and with the flanges extending toward the opening, said second channel means defining a second groove opening toward said opening in said wall, said outer flange of said second channel means terminating in an end remote from the web thereof, said first and second channel means being disposed on opposite sides of sides of said opening, said first groove having an unrestricted depth which is greater than the unrestricted depth of the second groove;

removable door means sized to close said opening and having opposed edge portions, said door means having a width between said edge portions no greater than the approximate distance between the web of the first channel means and said end of the outer flange of said second channel means to allow insertion of one of said edge portions of the door means into the first groove and subsequent insertion of the other of said edge portions of the door means past said end of the outer flange into said second groove whereby the outer flanges of said first and second channel means retain said door means against movement outwardly away from the wall, said inner flanges of said first and second channel means retain said door means against movement inwardly away from the wall and said webs restrict movement of said door means between said first and second channel means;

releasable locking means engageable with the door means for preventing movement of said one edge portion of the door means back toward the web of the first channel means a sufficient distance to allow removal of the door means;

means for preventing removal of the door means by moving the door generally parallel to the first and second grooves; and said first and second channel means extending along opposed lateral edges of the opening and interengaging means on said wall along the upper edge of said opening and on the upper edge of the door means to prevent substantial movement of the upper edge of said door means outwardly relatively to the wall.

11. In a removable door structure, the combination of:

a wall having an opening therein;

first substantially rigid channel means on said wall adjacent said opening and including inner and outer flanges interconnected by a web with the web being remote from the opening and with the flanges extending toward the opening, said first channel means defining a first groove opening toward said opening in said wall;

a second substantially rigid channel means on said wall adjacent said opening including inner and outer flanges interconnected by a web with the web being remote from the opening and with the flanges extending toward the opening, said second channel means defining a second groove opening toward said opening in said wall, said outer flange of said second channel means terminating in an end remote from the web thereof, said first and second channel means being disposed on opposite sides of said opening, said first groove having an unrestricted depth which is greater than the unrestricted depth of the second groove;

removable door means sized to close said opening and having opposed edge portions, said door means having a width between said edge portions no greater than the approximate distance between the web of the first channel means and said end of the outer flange of said second channel means to allow insertion of one of said edge portions of the door means into the first groove and subsequent insertion of the other of said edge portions of the door means past said end of the outer flange into said second groove whereby the outer flanges of said first and second channel means retain said door means against movement outwardly away from the wall, said inner flanges of said first and second channel means retain said door means against movement inwardly away from the wall and said webs restrict movement of said door means between said first and second channel means;

releasable locking means engageable with the door means for preventing movement of said one edge portion of the door means back toward the web of the first channel means a sufficient distance to allow removal of the door means;

means for preventing removal of the door means by moving the door generally parallel to the first and second grooves; and said first and second channel means extending substantially continuously along opposed lateral edges of said opening and sealing means for sealing the upper edge portion of the door means to the wall.

References Cited

UNITED STATES PATENTS

| | | | |
|---|---|---|---|
| 2,580,957 | 1/1952 | Reeves | 49—463 X |
| 2,648,458 | 8/1953 | Petersen | 220—41 |
| 2,920,781 | 1/1960 | Butcher et al. | 220—1.5 X |
| 3,377,747 | 4/1968 | Donkin | 49—463 X |

FOREIGN PATENTS

| | | |
|---|---|---|
| 113,979 | 10/1941 | Australia. |
| 416,288 | 9/1934 | Great Britain. |

RAPHAEL H. SCHWARTZ, Primary Examiner

U.S. Cl. X.R.

49—463